United States Patent Office 2,795,401
Patented June 11, 1957

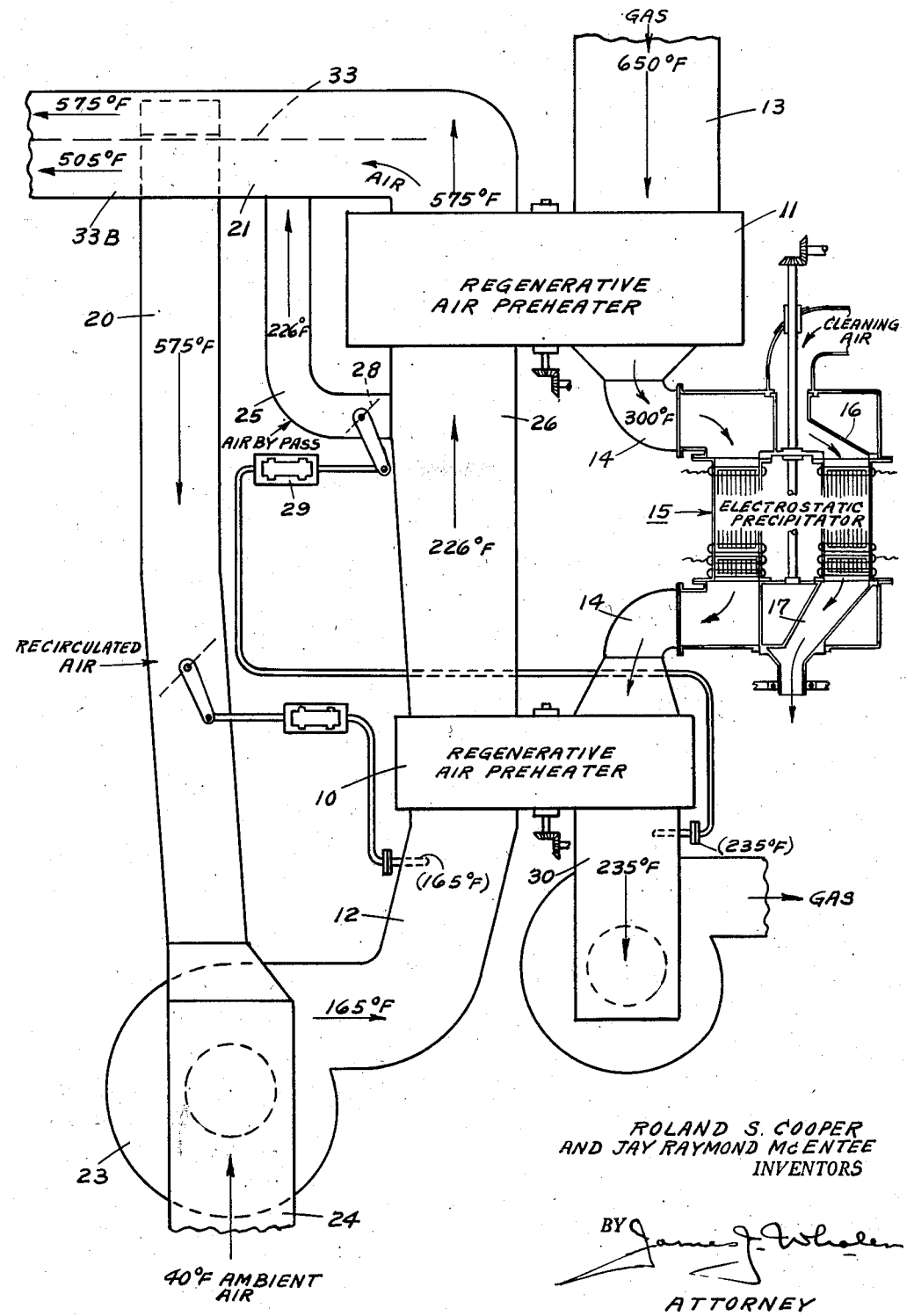

2,795,401

PRECIPITATOR INTERMEDIATE SERIES AIR HEATERS

Roland S. Cooper, River Forest, Ill., and Jay Raymond McEntee, San Francisco, Calif., assignors, by mesne assignments, to The Air Preheater Corporation, New York, N. Y., a corporation of New York Application September 23, 1953, Serial No. 381,898

3 Claims. (Cl. 257—2)

The present invention relates to heat exchange apparatus particularly to air heaters and specifically to an improved arrangement wherein a dust collector is interposed between a pair of regenerative air heaters in a system promoting the efficiency of these apparatuses.

The efficiency of the electrostatic precipitators is dependent upon operation with gases at relatively high temperatures so that the particles entrained in the gases do not collect moisture and may readily be separated. Concomitantly, the efficient operation of a steam generator, as in a power plant, requires that the final exit gas temperatures be reduced to as low value as practical by means of heat exchange apparatus including air heaters which preheat the air for combustion. At the same time the operation of air heaters at low exit gas temperatures tends to produce corrosion of the heat exchange surfaces and fouling of the passages therebetween particularly in a rotary regenerative air preheater.

The present invention contemplates an improved system leading to correction of the conditions related above by locating an electrostatic precipitator in a position between the two air heaters which together have sufficient heat exchange surface to lower the exit gas temperature to operating levels heretofore deemed impractical. In order to maintain the required temperature operating conditions both in the precipitator and in the air heaters, part of the highest temperature air is recirculated for flow through the series connected air heaters so as to maintain a predetermined air inlet temperature. A bypass around the second air heater, in the direction of air flow, enables a desired gas outlet temperature to be maintained by regulating the heat absorption in the second preheater.

The invention will be best understood upon consideration of the following detailed description of an illustrative embodiment thereof when read in conjunction with the accompanying drawing in which the single figure is a diagrammatic representation of an air preheater and dust collector installation embodying the present invention.

The numerals 10 and 11 designate a pair of air preheaters illustrated as of the rotary regenerative type which are connected in series relation for the flow of gas and air therethrough, the air inlet duct being designated 12 and the gas inlet duct being designated 13. A duct 14 connects the gas outlet of the second air preheater 11 with the gas inlet of the first air preheater 10 and interposed therein is an electrostatic precipitator, designated as a whole by the numeral 15. With this arrangement dust and other foreign particles carried by the gas stream are ionized and separated out on the collecting surfaces of the precipitator 15 from which surfaces they are removed by a continuously operating cleaning device consisting, for example, of a rotary air nozzle 16 which directs a stream of high velocity air through a segregated portion of the entire bank of electrodes while the dust is collected in a hopper 17 operating in synchronism with the nozzle 16.

Experience shows that with certain coal as fuels trouble may be encountered in removing the fly ash from the hoppers of conventional dust collectors at temperatures ranging from 240–260° F. Trouble is sometimes encountered with the gas temperature at 260° and becomes accentuated when it reaches 240° F., which it can do in the winter months and under low load conditions. This is even more critical with an outdoor installation. This experience has made it apparent that the ordinary arrangement of preheaters followed by conventional dust collectors would prevent operation of a power plant at any greater heat recovery than involved in reducing gas temperatures to about 275° F. leaving the preheaters. However, coal costs and high load factors on a power unit make it desirable to consider greater heat recovery such as in terms of 250° F. and 235° F. gas temperatures leaving the preheaters which would bring the gas temperatures down to something like 240° or 225° entering the dust collectors with the ordinary arrangement.

The present invention proposes to overcome these conditions through the arrangement of the heaters 10 and 11 in series with the dust collector 15 in between. With this arrangement the gas temperature may definitely be reduced to 235°, which is impossible with all of the surface in preheaters located either before or after the dust collectors. The heat recovery in the heater 11 works out perfectly to give 300° F. gas entering the heater 10 for the 235° heat recovery.

To maintain the desired high temperatures continuously for efficient separation of the dust particles in the electrostatic precipitator 15 as well as attain the desired control of air temperatures in the preheaters 10 and 11 a recirculation duct 20 leads from the air outlet duct 21 of the second, or down stream air preheater 11 to the inlet of the induced draft fan 23 where it is mixed with ambient air drawn in through the duct 24 before passing into the first or up stream air heater 10 through the inlet duct 12. With this arrangement the initially entering air has its temperature raised as from 40° F., for example, to 165° F. before entering the air preheater 10 so that corrosion of the heat transfer surfaces or clogging of the passages therebetween at the cold end of the preheater 10 is minimized. To maintain the desired final gas temperature a bypass duct 25 leads from the air inlet 26 of the second or down stream preheater 11 to the air outlet duct 21 which is located between the point of connection of the return air duct 20 and the outlet proper of the preheater 11. A damper 28 in the bypass duct is operable by a motor device 29 responsive to the temperature in the gas outlet duct 30. The air return duct is connected to the air outlet duct 21 at one side of a partition 33 that extends axially of this duct while the air bypass duct 25 is connected into the air outlet duct 21 on the opposite side of the partition. The partition extends from a point adjacent the air outlet proper of the preheater 11 to a point beyond the connection for the air return duct 20. In this way maximum temperature is provided for the recirculation air although the air outlet temperature in the part 33B of the duct may be modified by air bypassed in through the duct 25 as the motor 29 responds to the gas outlet temperature in duct 30 to maintain a gas outlet temperature approximately at or just above a practical minimum.

The 300° F. gas condition in duct 14 is advantageous for good operation of the dust collector 15 as it permits the dust collectors to be easily cleaned and also operate at the minimum practical power cost for charging the electrodes. The entering air temperature in duct 12 and the leaving gas temperature in duct 30 may be maintained constant at all loads under all ambient air temperatures. The hot air at maximum temperatures for recirculation through duct 20 is taken from the discharge of the air heater from the partitioned duct 21 which keeps the amount of recirculation air required at a minimum. The gas temperature entering the cold heater 10 and the dust collector 14 may be maintained at 300° F. through the use of the cold air bypass 25 around the hot heater. The hot heater 11 is well above any dew point as the air temperature entering it will always be in the neighborhood of 226° and the leaving gas temperature approximately 300°. Deposit and corrosion conditions in the cold heater 10 are minimized. The complete control of the leaving gas temperature from the cold heater 10 and temperature of the gas through the dust collector 15 as well as the control of the entering air temperature into the cold heater 10 are practical solutions of operation of large units under a variety of loads and ambient air temperatures which outdoor installations are subjected to.

What we claim is:

1. An air preheating installation for imparting heat from a stream of hot gases to a stream of air flowing in counterflow comprising: a pair of air heaters mounted in spaced relation and having air and gas passages arranged for indirect exchange of heat between streams of gas and air; ducts connecting both the air and the gas passages of one heater to those of the other heater for the flow of gas and air therethrough in series relation; a damper controlled bypass connecting the air inlet and outlet ducts of the air heater that is located downstream in the air duct; a duct connecting the air outlet of said downstream air preheater with the air inlet of the second or upstream air heater; and a damper in said duct operable to regulate the flow of hot air to said upstream air heater so as to lower the heat absorption therein and maintain a predetermined gas outlet temperature from said upstream air heater; a partition in the air outlet duct extending parallel to its axis from a point adjacent the air outlet of said downstream air heater so that heated air flows on both sides of said partition; said air bypass duct and said hot air return duct being connected into said air outlet duct at opposite sides of said partition and being separated thereby to prevent bypass air mixing with the heated air entering said air return duct.

2. An air preheating installation for imparting heat from a stream of hot gases to a stream of air flowing in counterflow comprising: a pair of regenerative air preheaters mounted in spaced relation and having air and gas passages arranged for indirect exchange of heat between streams of gas and air; ducts connecting both the air and the gas passages of one heater to those of the other heater for the flow of gas and air therethrough in series relation; a damper controlled bypass connecting the air inlet and air outlet ducts of the air preheater that is located downstream in the air duct; a duct connecting the air outlet duct of said downstream air preheater at a point downstream of said air bypass with the air inlet of the second or upstream air heater; and a damper in said duct operable to regulate the flow of hot air to said upstream air heater so as to lower the heat absorption therein and maintain a predetermined gas outlet temperature from said upstream air heater; means responsive to the temperature of air entering said upstream preheater for controlling said return air damper so as to maintain a predetermined air inlet temperature; and means responsive to the temperature of gas leaving said upstream heater for controlling said bypass damper so as to regulate the heat absorption in said downstream air heater and thereby maintain a predetermined gas outlet temperature from said upstream air heater.

3. In an air heating installation having a pair of air heaters mounted in spaced relation with air and gas passages arranged for indirect exchange of heat between streams of gas and air, ducts connecting both the air and the gas passages of one heater to those of the other heater for the flow of gas and air therethrough in series relation, and a dust collector interposed in said gas duct between the two heaters; a damper controlled bypass connecting the air inlet and air outlet of the air heater that is located downstream in the air duct; a damper controlled duct connecting the air outlet of said downstream air preheater with the air inlet of the second or upstream air heater; means responsive to the temperature of air entering said upstream preheater for controlling said return air damper so as to maintain a predetermined air inlet temperature to said upstream air heater and thereby regulate the gas outlet temperature therefrom; and means responsive to the temperature of gas leaving said upstream heater for controlling said bypass damper so as to regulate the heat absorption in said downstream air heater and thereby maintain a predetermined gas temperature at the inlet of said dust collector.

References Cited in the file of this patent

UNITED STATES PATENTS

| | | |
|---|---|---|
| 1,780,300 | Jacobus et al. | Nov. 4, 1930 |
| 1,980,109 | Stockly | Nov. 6, 1934 |
| 2,363,870 | Karlsson et al. | Nov. 28, 1944 |
| 2,499,358 | Cooper et al. | Mar. 7, 1950 |
| 2,582,830 | Hawley | Jan. 15, 1952 |
| 2,669,974 | Johnsen | Feb. 23, 1954 |

FOREIGN PATENTS

| | | |
|---|---|---|
| 688,656 | Great Britain | Mar. 11, 1953 |